United States Patent
Le Moal et al.

(10) Patent No.: US 8,407,440 B2
(45) Date of Patent: Mar. 26, 2013

(54) TECHNIQUES FOR SCHEDULING REQUESTS FOR ACCESSING STORAGE DEVICES USING SLIDING WINDOWS

(75) Inventors: Damien C. D. Le Moal, Machida (JP); Donald Joseph Molaro, Cupertino, CA (US); Jorge Campello de Souza, Cupertino, CA (US)

(73) Assignee: HGST Netherlands B.V., Amsterdam (NL)

( * ) Notice: Subject to any disclaimer, the term of this patent is extended or adjusted under 35 U.S.C. 154(b) by 858 days.

(21) Appl. No.: 12/169,318

(22) Filed: Jul. 8, 2008

(65) Prior Publication Data

US 2010/0011182 A1 Jan. 14, 2010

(51) Int. Cl.
*G02F 12/00* (2006.01)
(52) U.S. Cl. ........ 711/167; 711/100; 711/112; 711/154; 718/103
(58) Field of Classification Search .................. 711/167, 711/4, E12.078, 100, 112, 154, E12.001; 718/103
See application file for complete search history.

(56) References Cited

U.S. PATENT DOCUMENTS

| | | | | |
|---|---|---|---|---|
| 6,223,249 B1 * | 4/2001 | Kato et al. | ..................... | 711/112 |
| 2009/0100433 A1 * | 4/2009 | Kang et al. | ..................... | 718/103 |
| 2010/0011149 A1 | 1/2010 | Molaro et al. | | |

FOREIGN PATENT DOCUMENTS

WO 2004095254 11/2004

OTHER PUBLICATIONS

"Elevator algorithm," Wikipedia, the free encyclopedia, http://en.wikipedia.org/wiki/Elevator_algorithm, last modified May 7, 2008, pp. 1-2.
Mohamed F. Mokbel et al., "Scalable Multimedia Disk Scheduling," Proceedings of the 20th International Conference on Data Engineering (ICDE'04), Mar. 30-Apr. 2004, pp. 498-509.
K. W. Ng et al., "Analysis on Disk Scheduling for Special User Functions," IEEE Transactions on Circuits and Systems for Video Technology, vol. 9, No. 5, Aug. 1999, pp. 752-765.
Inki Hong et al., "On-Line Scheduling of Hard Real-Time Tasks on Variable Voltage Processor," ICCAD98, 1998, pp. 653-656.
"Disk Scheduling Algorithm, FCFS," 1http://www.kom.tu-darmstadt.de/projects/iteach/itbeankit/lessons/scheduling/FCFS/fcfs.html, p. 1, printed Jun. 13, 2008.
First office action for Chinese patent application 200910140130.4, counterpart to U.S. Appl. No. 12/169,318, State Intellectual Property Office, P.R. China, Jan. 31, 2011, pp. 1-19.

* cited by examiner

*Primary Examiner* — Jasmine Song
(74) *Attorney, Agent, or Firm* — Steven J. Cahill

(57) ABSTRACT

A system includes a storage device and a scheduler. The scheduler determines if deadlines of requests for accessing the storage device fall within first and second sliding windows. The scheduler issues requests that are in the first sliding window in a first order of execution and requests that are in the second sliding window in a second order of execution.

20 Claims, 4 Drawing Sheets

TECHNIQUES FOR SCHEDULING REQUESTS FOR ACCESSING STORAGE DEVICES USING SLIDING WINDOWS

BACKGROUND OF THE INVENTION

The present invention relates to data storage devices, and more particularly, to techniques for scheduling requests for accessing storage devices using sliding windows.

Data storage devices include hard disk drives, network storage devices, solid-state memory devices (e.g., Flash memory), etc. Data storage devices are also referred to as storage devices.

BRIEF SUMMARY OF THE INVENTION

According to some embodiments of the present invention, a system includes a storage device and a scheduler. The scheduler determines if deadlines of requests for accessing the storage device fall within first and second sliding windows. The scheduler issues requests that are in the first sliding window in a first order of execution and requests that are in the second sliding window in a second order of execution. According to some embodiments of the present invention, the scheduler determines if the requests for accessing the storage device fall within first, second, and third sliding windows, and the scheduler issues requests that are in the third sliding window in a third order of execution. The present invention includes methods and systems for performing the embodiments described herein.

Various objects, features, and advantages of the present invention will become apparent upon consideration of the following detailed description and the accompanying drawings.

DETAILED DESCRIPTION OF THE INVENTION

Figure 1:
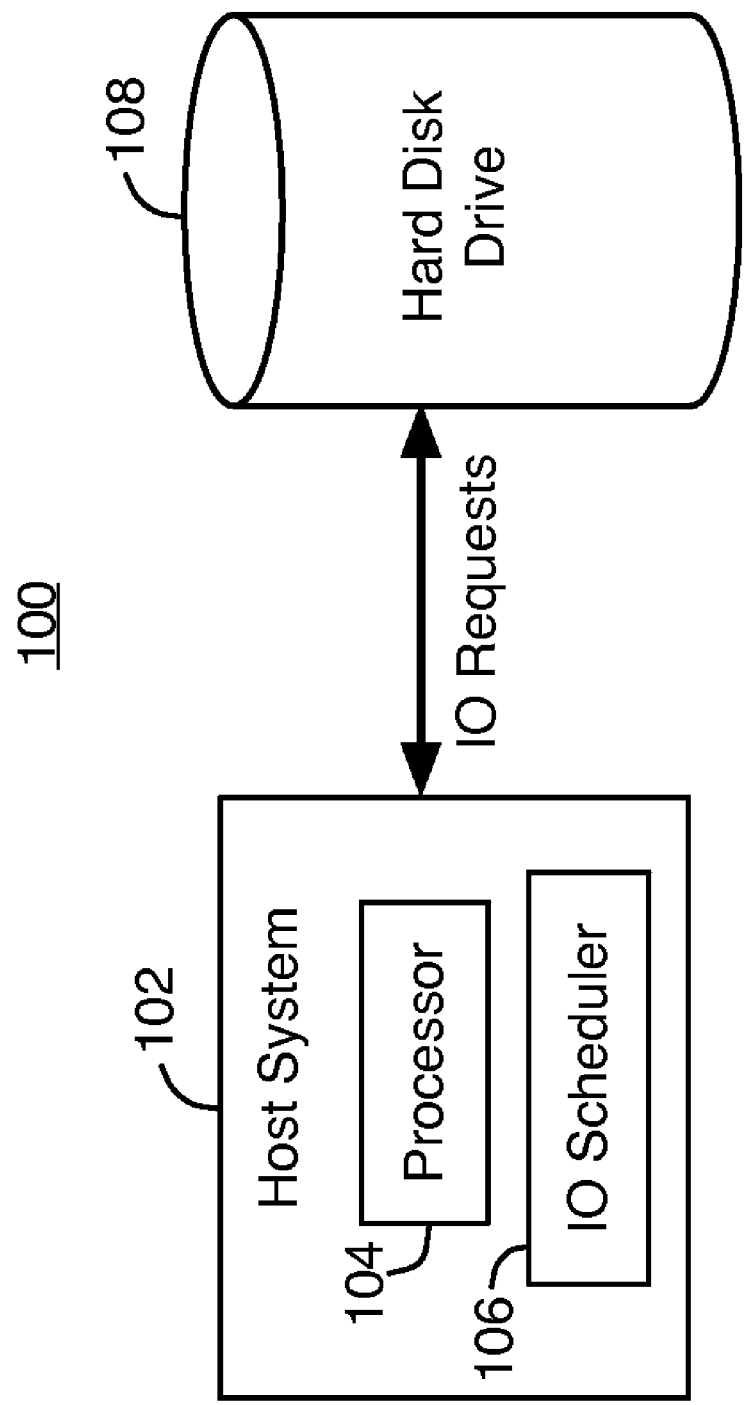
FIG. 1 is a block diagram that illustrates a system that can implement techniques of the present invention.

Systems such as digital video recorders (DVRs), set-top boxes (STBs), and media network attached storage devices (Media NAS), are evolving to support advanced features such as high-definition content, multi-stream capability, and mixed workloads. These features combine real-time traffic such as audio-video (AV) traffic and non-real-time traffic. For example, basic DVR functionality may include recording real-time AV streams to a hard disk drive, and later reading AV streams back to a user for viewing. In addition, a DVR, STB or Media NAS device may provide non-real-time functions and applications such as an electronic program guides, photo browsing, web browsing, music play list management, general purpose file serving, etc.

Electronic systems such as high-definition multi-room digital video recorders (DVR) are capable of simultaneously recording digital content from several sources, such as cable, satellite or over-the-air broadcasting tuners, while at the same time, allowing for the local playback of stored content and its streaming to other devices over a home network. Many of these devices also provide other types of applications such as digital photo storage and viewing, Internet browsing, email games, etc.

Recording and reading simultaneously multiple streams of high definition video, however, places huge demands on the system hard disk drive (HDD) and on the operating system storage stack (file system and an input/output scheduler). The required level of performance is often beyond the original design goals and usage purpose of general-purpose storage stacks. In addition to introducing severe performance limitation, the file system and input/output (IO) scheduler have no inherent ability to distinguish between a streaming application, e.g. playing a movie, and a best-effort task, e.g. viewing a photo. As a consequence, the on-time processing of time-critical disk input and output (IO) requests cannot be consistently guaranteed resulting in a poor quality of service (QoS) for video recording and playback.

Some embodiments of the present invention mitigate many of these quality and reliability problems by using a different approach to streaming file management. Particular embodiments of the present invention enhance the scheduling of read and write IO requests. As described in more detail below, in one embodiment, the system includes a data storage device and a scheduler. The scheduler is operable to receive read and write IO requests that have deadlines, and then issue the requests to the data storage device, in an efficient manner. The scheduler may determine whether each deadline falls within a scheduling window. The scheduling window may be defined by a current time and threshold time. These parameters of the scheduling window are based at least in part on predicted request completion times.

The scheduler defers issuing the IO requests that fall after the scheduling window to a later time in order to issue and complete urgent IO requests that have deadlines that fall within the scheduling window, and thus have earlier deadlines. The process of deferring some IO requests ensures that the scheduler completes IO requests before their respective deadlines. As described in more detail below, the scheduler may group multiple IO requests in order to issue IO requests in batches. Issuing IO requests in batches increases idle times allowing the storage device to enter power saving states or to perform maintenance functions.

Although the present invention disclosed herein is described in the context of digital video recorders and hard disk drives, the present invention can apply to other types of systems such as set-top-boxes, digital surveillance systems, video editing systems, multi-media network storage devices and other types of storage devices, and still remain within the spirit and scope of the present invention.

FIG. 1 is a block diagram that illustrates a system that can implement techniques of the present invention. The system 100 shown in FIG. 1 includes a host system 102 that includes a processor 104 and an input/output (IO) scheduler 106. The system 100 also includes a data storage device such as a hard disk drive 108. The host system 102 may be a DVR, set-top-box, or any other type of computer system, such as an embedded system, a minimalistic system, hand-held device or computer, etc. While the IO scheduler 106 is shown residing on the host system 102, the IO scheduler 106 may reside in any suitable location, separate from the host system 102 (e.g., on hard disk drive 108, etc.).

The input/output (IO) scheduler 106 is located within the operating system layer and is typically responsible for deciding when to issue real-time and non-real-time read and write requests to the hard disk drive 108. Read and write requests are also referred to herein as IO requests or simply as requests. Processing these real-time and non-real-time functions generates traffic to and from the hard disk drive 108.

In operation, the host system 102 sends IO requests to the hard disk drive 108 via the IO scheduler 106. The IO scheduler 106 is operable to receive the IO requests from the processor 104, and determine deadlines for each of the IO requests. In some embodiments, the IO requests are for accessing the hard disk drive 108. For example, the IO requests include instructions for reading data from and writing data to the hard disk drive 108. As such, an IO scheduler 106 is operable to issue the IO requests to the hard disk drive 108. The hard disk drive 108 then performs the requested IO requests.

According to some embodiments of the present invention, a traffic mixer is an IO scheduler that is implemented as an operating system kernel module. The operating system can be, for example, Linux, Windows, VxWorks, or any other suitable operating system. Using deadline information attached to IO requests, the traffic mixer differentiates and schedules real-time (RT) and best effort (BE) requests, ensuring the completion of RT requests before their deadline and minimizing processing latency for BE requests. BE requests are non-real-time requests. RT and BE requests include read requests and write requests.

As the traffic mixer is not a bandwidth reservation system, IO scheduling decisions are made dynamically upon request arrival or completion. As a consequence, it is possible to overload the system with RT traffic and cause the real-time scheduling to fail. Some embodiments of the present invention address this issue by executing requests in multiple sliding windows, as described in detail below.

Figure 2:
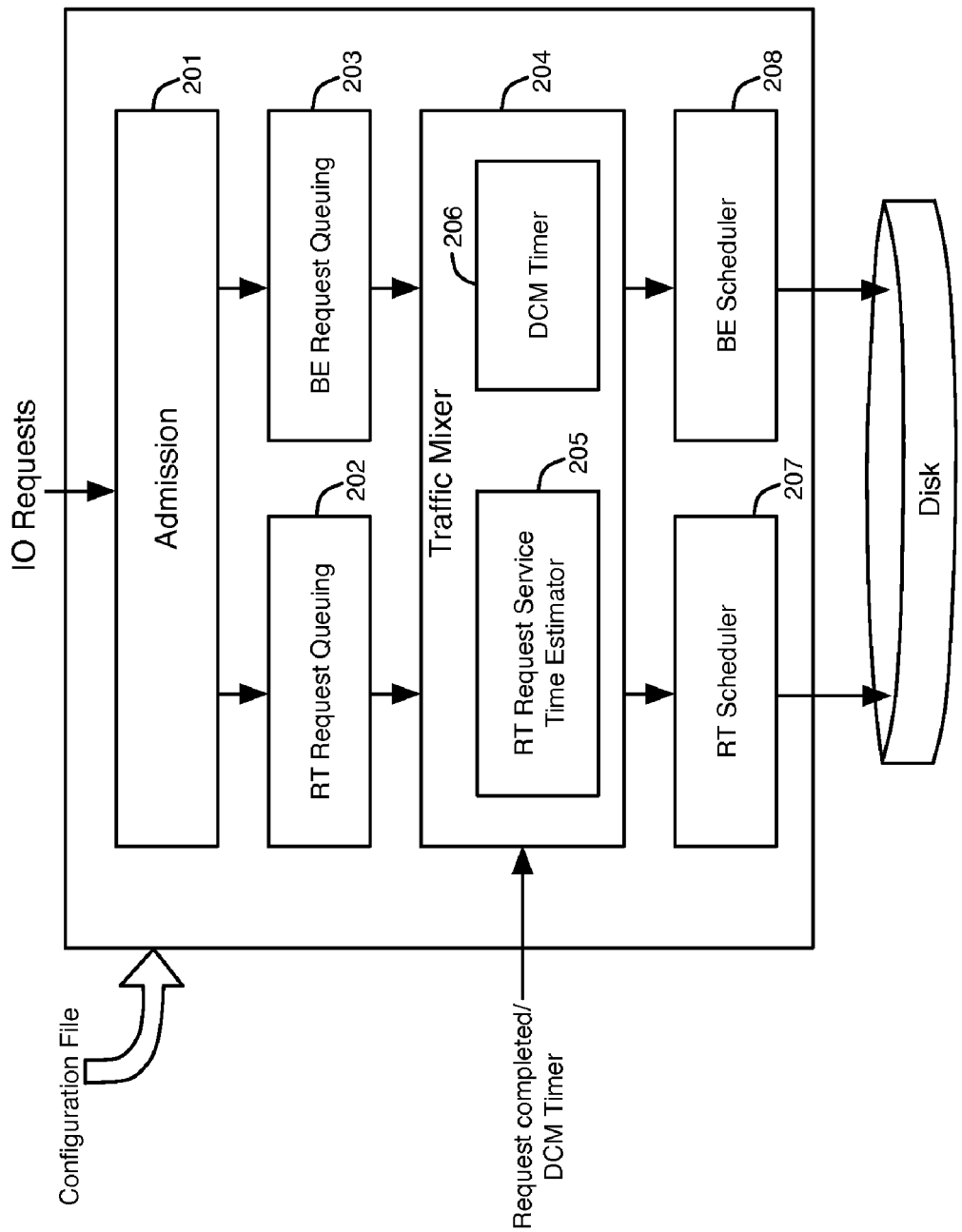
FIG. 2 illustrates how a traffic mixer is organized, according to an embodiment of the present invention.

FIG. 2 illustrates how a traffic mixer is organized, according to an embodiment of the present invention. Received read and write IO requests to the hard disk drive first go through an admission step 201 to determine their type. A request with a deadline attached to the request is treated as a real-time (RT) request. All other requests are treated as best effort (BE) requests. For RT requests, the admission step 201 also limits the deadline to a maximum value (e.g., twenty seconds).

Requests are then queued depending on their type. Real-time (RT) requests are queued in step 202, and best effort (BE) requests are queued in step 203. The list of outstanding best effort (BE) requests is maintained in execution order. Execution order is the order in which the requests can be executed most efficiently, i.e., in the least amount of time. In general, the most efficient execution order varies according to the hard disk drive model, physical block layout, etc. Using an example hard disk drive model, the execution order can be the logical block address (LBA) (i.e., disk offset) order.

In step 202, the RT requests are queued into two different lists, one in execution order and another in deadline order. The index sets $e_0, e_1, \ldots, e_{N_R-1}$ and $d_0, d_1, \ldots, d_{N_R-1}$ are used to represent the sequence of NR requests in logical block address (LBA) order (i.e., execution order) and deadline order, respectively. In step 205, traffic mixer 204 estimates the service time of each RT request, as well as the service time of the entire set of outstanding RT requests if this set is scheduled in LBA order. The estimated service time of each request is used to decide the type of request (real-time or best effort) to execute next. If the set of outstanding RT requests is scheduled in LBA order, the service time of the entire set of outstanding RT requests may also be used to decide the type of request to execute next.

RT Request Service Time Estimation

At step 205, an RT request service time estimator in traffic mixer 204 estimates the service time of RT requests using a disk model. This disk model is based on the rotational period $T_r$ of the disk in the hard disk drive, the average seek time $T_S$ of the hard disk drive, the hard disk drive's maximum and minimum transfer speed $D_{tmax}$ and $D_{tmin}$, and the largest LBA of the disk $L_{max}$. This disk model assumes that the disk transfer speed varies linearly between the maximum and minimum speeds. The service time $T_C(R)$ of an RT request R of size S(R) and of LBA address L(R) is estimated as shown in equation (1) below.

$$T_C(R) = \alpha \frac{T_r}{2} + \beta T_s + \frac{S(R)}{D_{tmax} - \frac{(D_{tmax} - D_{tmin})L(R)}{L_{max}}} \quad (1)$$

In equation (1), $\alpha$ is equal to 1 for a read request. The term $\alpha T_r/2$ represents the average rotational latency of the disk in the hard disk drive. In the case of write requests, $\alpha$ is equal to 3 so that a full rotation time of the disk is added to the estimate to account for the higher probability of a revolution miss of a write request. $\beta$ is always equal to 1, unless the estimated request is sequential with respect to the previous one estimated, in which case, $\beta$ is set to 0 to reflect the absence of head seek. Another more precise estimator can be used instead of the estimator described above. The estimator described above has the advantage of using only a small set of parameters that can be easily obtained from the disk specifications or directly measured. The disk model described herein makes the probability of underestimation adequately small.

Mixer Policy

When there is only one type of request, then that type of request is selected as the next type of request to execute. In general, both BE and RT requests are present. When both BE and RT requests are present, traffic mixer 204 determines if a best effort request can be executed and still maintain a margin m on all pending RT requests. Traffic mixer 204 makes that determination by keeping track of the time H at which the RT requests must be executed in order to satisfy the margin constraint m. The time H can be computed using equation (2) shown below.

$$H = \min_{j \in \{0, 1, \ldots N_R-1\}} \left( T_D(R_{e_j}) - \left( m + \sum_{i=0}^{j} T_C(R_{e_i}) \right) \right) \quad (2)$$

In equation (2), $T_D(R_{e_j})$ refers to the deadline of request $R_{e_j}$, where $R_{e_j}$ is the $j_{th}$ RT request when the RT requests are considered in execution order (i.e., in LBA order). Also, in equation (2), $T_C(R_{e_j})$ is the estimated processing (completion) time of the RT request $R_{e_j}$. At the current time t, if H≧t, then the set of RT requests is schedulable. If H−t≧$T_C$(R'), where R' is the next BE request in line, then the BE request is executed, and the RT requests remain schedulable. If the test fails because H−t<$T_C$(R'), the scheduler starts executing RT requests. The mixer recalculates H each time a new RT request is received or completed.

RT Scheduler Policy

At step 207, a real-time (RT) scheduler executes RT requests. If H is greater than or equal to the current time t (i.e., H≧t), the real-time (RT) scheduler executes requests in LBA order. If H<t, the policy of the RT scheduler depends on the deadline of the earliest request $R_{d_0}$. If the deadline of the earliest request is less than or equal to the current time, i.e., $T_D(R_{d_0}) \leq t$ (e.g., request R missed its deadline), request R is not processed and marked as failed using the timeout error code. If the deadline of the earliest request is less than or equal to the current time t plus a parameter e, i.e., $T_D(R_{d_0}) \leq t+e$, then the RT scheduler executes the set of RT requests with deadlines smaller or equal to (t+e) in earliest-deadline-first (EDF) order. The parameter e is programmable. Otherwise, logical block address (LBA) order is applied on the following subset of RT requests as shown in equation (3), for each request $R_j$.

$$\{R_j | T_D(R_j) \leq T_D(R_{d_0}) + m\} \quad (3)$$

Figure 3A:
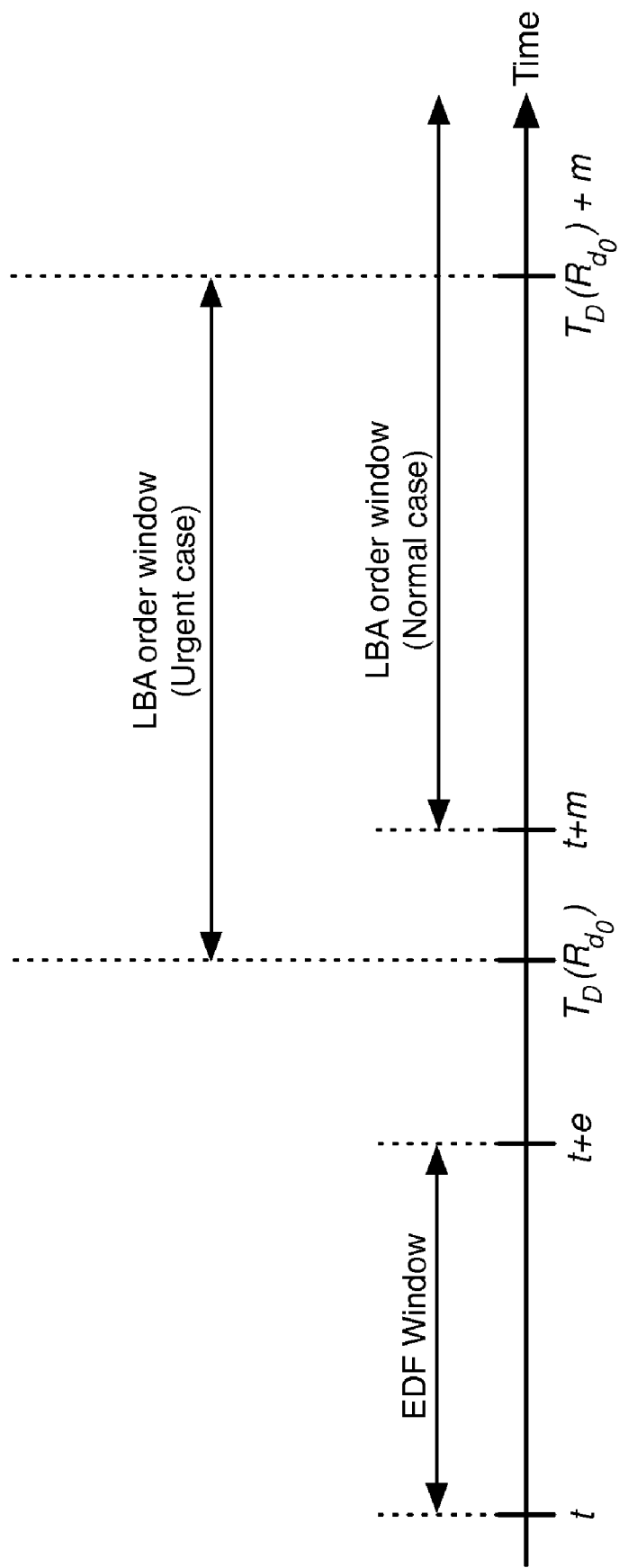
FIG. 3A illustrates three different scheduling windows that are used by a real-time scheduler to execute real-time read and write input/output (IO) requests, according to an embodiment of the present invention.

FIG. 3A illustrates three different scheduling windows that are used by the real-time scheduler to execute real-time read and write IO requests, according to an embodiment of the present invention. The three different scheduling windows shown in FIG. 3A are the earliest-deadline-first (EDF) window, the urgent case LBA order window, and the normal case LBA order window. Only real-time requests that have deadlines less than t+e are placed in the EDF window, where t is the current time. Real-time requests that have deadlines within the earliest deadline $T_D(R_{d_0})$ plus the quality of service (QoS) constraint margin m are placed in the urgent LBA order window. The set of real-time requests that are schedulable (i.e., having deadlines that are at least the constraint margin m from the current time t) are placed in the normal case LBA order window.

Requests in the urgent and normal LBA order windows are executed in LBA order. LBA order means ordering the requests by increasing LBA position on the hard disk drive or other type of data storage device. A set of IO requests that are schedulable using LBA order within a particular time interval means that the traffic mixer algorithm has determined that the requests with deadlines that fall in the time interval would complete by the end of the time interval.

If many real-time (RT) read and write requests are issued with deadlines that are large enough, the IO scheduler in some hard disk drives ignores the requests until enough time passes, and the deadlines become close enough to the current time. When a number of RT read and write requests become close enough to the current time, the IO scheduler can be suddenly confronted with a number of requests that cannot be processed before their deadlines. This problem can be generated if several streams with near simultaneous deadlines are being serviced.

To solve this problem, the RT scheduler determines if each of the read and write requests fall within one or more of the three different scheduling windows that are referred to in FIG. 3A as the immediate (EDF), urgent LBA order, and normal LBA order windows, according to an embodiment of the present invention. All three of these scheduling windows move dynamically with time. In other words, all three scheduling windows (immediate, urgent, and normal) shown in FIG. 3A are sliding windows that each move forward in time continuously as time advances. For example, if time increases by an amount T, then the beginning and end of each of the immediate, urgent, and normal windows all move forward in time by T, for small and large values of T.

All of the RT requests in the EDF window are processed as soon as possible in earliest-deadline-first (EDF) order. Thus, the request having the earliest deadline in the EDF window is selected as the next request to be executed. If there are no requests in the EDF window, the more efficient LBA order is used as the scheduling policy for executing the RT requests in the urgent and normal windows, with a variable set of requests considered depending on the deadline of the earliest request. Thus, if there are no requests in the EDF window, the selected requests are executed in LBA order. In particular, if the earliest request is in the LBA order normal window, then all of the requests are considered for being executed in LBA order. If the earliest request is in the LBA order urgent window, then the traffic mixer may decide to execute only some of the requests in LBA order. Even RT requests with a large deadline are considered as candidates for scheduling in the RT scheduler. Therefore, the RT scheduler does not become overwhelmed with a large number of RT requests that are nearing their deadlines. After each request is executed, the executed request is removed from the sliding window.

FIG. 3A shows an example where the deadline $T_D(R_{d_0})$ of earliest request $R_{d_0}$ is greater than t+e but less than t+m. The urgent LBA order window is defined based on the request with the earliest deadline. Therefore, the urgent LBA order window varies based on when the deadline of the earliest request occurs with respect to the current time. The two other windows depend on the current time t and the parameters e and m.

Figure 3B:
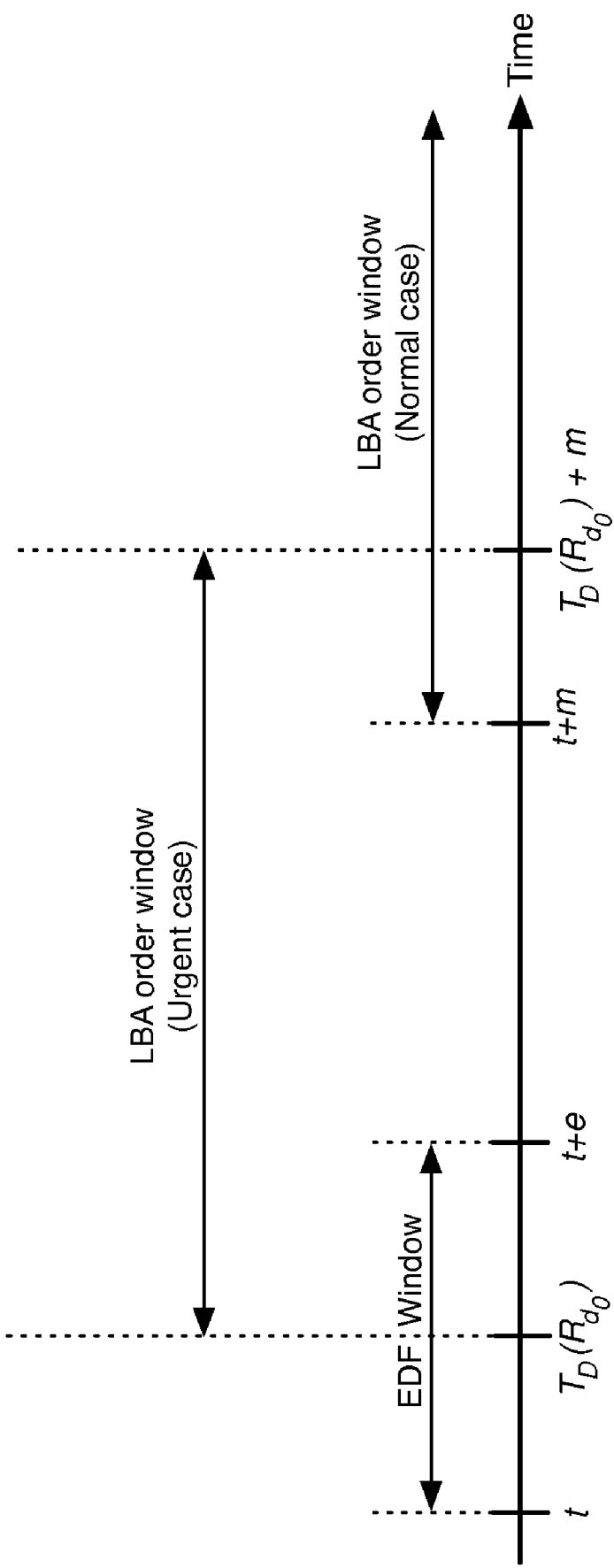
FIG. 3B illustrates another example of the three scheduling windows that are used by a real-time scheduler to execute real-time read and write IO requests, according to another embodiment of the present invention.

FIG. 3B illustrates another example of the three sliding windows that are used by the real-time scheduler to execute real-time read and write IO requests, according to an embodiment of the present invention. The three sliding windows shown in FIG. 3B are the same three sliding windows shown in FIG. 3A. In FIG. 3B, the urgent LBA order window overlaps with the EDF window, because the deadline of the earliest request $T_D(R_{d_0})$ is less than e from the current time t (i.e., $T_D(R_{d_0}) < t+e$).

BE Scheduler Policy

The execution order of the best-effort (BE) requests is determined by the BE scheduler at step 208 using an LBA order policy. According to this LBA order policy, the BE requests are executed in increasing LBA order, starting from the end LBA of the last request executed (either RT or BE).

Because BE request scheduling may be interrupted to process RT requests, the LBA variation may not be monotonic, potentially resulting in BE requests starvation. The BE scheduler addresses this issue by decreasing the age of the oldest BE request each time a BE request is chosen. If the age of this request becomes lower than the age of the BE request chosen using LBA order, the oldest request is chosen in its place.

Duty-Cycle Minimization

The duty cycle of the hard disk drive is defined as the percentage of time the hard disk drive is busy processing requests. A duty-cycle minimization (DCM) timer in the traffic mixer delays the processing of RT requests even in the situation where no BE requests are present, at step 206. This DCM delay allows for the potential accumulation of RT requests so that the RT scheduler can perform LBA order on a larger set of requests, resulting in better performance due to the reduced average seek distance between requests. The traffic mixer waits until time H to start executing the RT requests.

The traffic mixer 204 may group the IO requests into batches, depending on their deadlines. For example, the traffic mixer may group the IO requests having deadlines that fall within a particular scheduling window into a batch. The IO requests in this batch are issued to the hard disk drive sometime in a previous scheduling window. After the traffic mixer issues a batch of IO requests, the traffic mixer may issue as many best-effort requests as possible before the end of the scheduling window. If there are no more best-effort requests to issue before the end of the scheduling window, the traffic mixer may either begin issuing IO requests from the next batch, or may leave the hard disk drive idle until the next scheduling window begins.

The traffic mixer 204 may issue each batch of IO requests in the scheduling window that precedes the scheduling window containing the deadlines of those IO requests. Depending on how long it takes the IO requests to execute, issuing IO requests in the previous scheduling window may not be sufficient to guarantee that all of the IO requests complete before their deadlines. Some embodiments of the present invention can determine when to begin issuing a given batch of IO requests in order to ensure that all of the IO requests within the batch meet their respective deadlines. The deadlines may vary from short (e.g., 100-200 milliseconds), to middle range (e.g., 500-600 milliseconds), to long (e.g., 2 seconds). Some embodiments disclosed herein make use of either deadlines or priorities on incoming IO requests.

In order to improve the scheduling behavior, the traffic mixer 204 may utilize an adaptive hard disk drive model to estimate the amount of time required to complete one or more IO requests. The traffic mixer may then use an adaptive hard disk drive model to determine the latest time at which the traffic mixer should initiate a given batch of IO requests. For example, a batch of IO requests could be initiated when the time that the nearest deadline in the batch equals the estimated completion time for the batch plus some scheduling margin. In one embodiment, the scheduling margin refers to an extra safety margin that the traffic mixer adds on to the request completion time or batch completion time estimate. The measured margin is the difference between the actual request completion time or batch completion time and the specified request deadline or batch deadline.

In one embodiment, the estimated service time to complete all IO requests in the batch is determined by an adaptive hard disk drive model, where the estimated service time adapts to the actual hard disk drive request completion times. The traffic mixer may utilize a model of the hard disk drive to estimate request completion times and then adapt to actual request completion times or to measured margins from either individual requests or from batches of requests. As such, a model that consistently overestimates or underestimates request completion times would change over time to provide improved estimates. Accordingly, if a batch of IO requests were taking longer to complete than expected (i.e., measured margin smaller than the scheduling margin), the traffic mixer increases the scheduling margin. Conversely, if a batch of requests were completing more quickly than estimated by the hard disk drive model (i.e., measured margin larger than the scheduling margin), the traffic mixer decreases the scheduling margin. Further details of an Adaptive IO Scheduler are described in co-pending, commonly assigned U.S. patent application Ser. No. 11/848,174 to Molaro et al., filed Aug. 30, 2007, which is incorporated by reference herein in its entirety.

The foregoing description of the exemplary embodiments of the present invention has been presented for the purposes of illustration and description. It is not intended to be exhaustive or to limit the present invention to the examples disclosed herein. In some instances, features of the present invention can be employed without a corresponding use of other features as set forth. Many modifications, changes, and variations are possible in light of the above teachings, without departing from the scope of the present invention. It is not intended that the scope of the present invention be limited with this detailed description. For example, embodiments of the present invention can be implemented using one or a combination of hardware, software, and a computer-readable medium containing program instructions. Software implemented by embodiments of the present invention and results of the present invention can be stored on a computer-readable medium such as memory, hard disk drive, compact disc (CD), digital video disc (DVD), or other media. Results of the present invention can be used for various purposes such as being executed or processed by a processor, being displayed to a user, transmitted in a signal over a network, etc.

What is claimed is:

1. A system comprising:
   a storage device; and
   a scheduler that determines if deadlines of requests for accessing the storage device fall within first and second sliding windows, and
   wherein the scheduler issues requests that are in the first sliding window in a first order of execution and requests that are in the second sliding window in a second order of execution, wherein the requests for accessing the storage device comprise real-time requests having deadlines, wherein all other requests for accessing the storage device are best effort requests, wherein the scheduler estimates a service time for each of the real-time requests, and wherein the scheduler determines whether to execute the real-time requests or the best effort requests next based on the estimated service time for each of the real-time requests.

2. The system defined in claim 1 wherein the requests in the first sliding window are issued by the scheduler in order of the deadlines of the requests in the first sliding window, with earliest deadlines of the requests in the first sliding window being executed first.

3. The system defined in claim 2 wherein the requests in the second sliding window are issued by the scheduler in order of logical block addresses.

4. The system defined in claim 2 wherein the scheduler determines if the deadlines of the requests for accessing the storage device fall within the first sliding window, the second sliding window, and a third window, and wherein the scheduler issues requests that are in the third sliding window in a third order of execution, and
   wherein an end of each of the first and the second sliding windows moves forward in time continuously as time advances such that the end of each of the first sliding window and the second sliding window moves forward by an amount equal to an increase in time.

5. The system defined in claim 4 wherein the requests in the second sliding window and the requests in the third window are executed in order of increasing logic block address position on the storage device.

6. The system defined in claim 1 wherein the scheduler issues at least one of the requests at a deferred time if the deadline for the at least one request falls after a time threshold.

7. The system defined in claim 1 wherein the second sliding window begins at a deadline of the request having the earliest deadline.

8. A computer system that comprises code for optimizing a scheduler, wherein the code is stored on a non-transitory computer readable medium, the computer system comprising:
   code for receiving requests for accessing a storage device;
   code for determining if deadlines of the requests for accessing the storage device fall within first and second sliding windows;
   code for issuing first requests that are in the first sliding window in a first order;
   code for issuing second requests that are in the second sliding window in a second order, wherein the requests for accessing the storage device comprise real-time requests having deadlines, and wherein all other requests for accessing the storage device are best effort requests; and code for estimating a service time for each of the real-time requests and determining whether to execute the real-time requests or the best effort requests next based on the estimated service time for each of the real-time requests.

9. The computer system defined in claim 8 wherein the code for issuing the first requests in the first order further comprises code for issuing the first requests in earliest deadline first order based on the deadlines of the first requests.

10. The computer system defined in claim 9 wherein the code for issuing the second the requests in the second order further comprises code for issuing the second requests in order of logical block addresses.

11. The computer system defined in claim 8 further comprising:

code for determining if deadlines of the requests for accessing the storage device fall within a third window; and code for issuing third requests that are in the third window in a third order.

12. The computer system defined in claim 11 wherein the code for issuing the third requests in the third order further comprises code for issuing the third requests in order of increasing logical block address position on a hard disk drive.

13. The computer system defined in claim 8 wherein the code for estimating a service time for each of the real-time requests further comprises:

code for estimating service times of the real-time requests using a model that is based on a rotational period of a disk in a hard disk drive, an average seek time of the hard disk drive, maximum and minimum transfer speeds of the hard disk drive, and a largest logical block address of the disk.

14. The computer system defined in claim 8 wherein the second sliding window begins at a deadline of the request having the earliest deadline.

15. A method for issuing requests for accessing a storage device using a scheduler, the method comprising:

receiving requests for accessing the storage device;

determining if deadlines of the requests for accessing the storage device fall into first and second sliding windows;

issuing first requests that are in the first sliding window in a first order; and issuing second requests that are in the second sliding window in a second order, wherein the requests for accessing the storage device comprise real-time requests having deadlines, and wherein all other requests for accessing the storage device are best effort requests; and estimating a service time for each of the real-time requests and determining whether to execute the real-time requests or the best effort requests next based on the estimated service time for each of the real-time requests.

16. The method defined in claim 15 wherein issuing the first requests in the first order further comprises issuing the first requests in earliest deadline first order based on the deadlines of the first requests.

17. The method defined in claim 16 wherein issuing the second requests in the second order further comprises issuing the second requests in order of logical block addresses.

18. The method defined in claim 15 wherein determining if the deadlines of the requests for accessing the storage device fall into the first and the second sliding windows further comprises determining if the deadlines of the requests for accessing the storage device fall into the first sliding window, the second sliding window, and a third window, wherein the method further comprises:

issuing third requests that are in the third window in a third order.

19. The method defined in claim 18 wherein issuing the third requests in the third order further comprises issuing the third requests in order of increasing logical block address position on a hard disk drive.

20. The method defined in claim 15 wherein the second sliding window begins at a deadline of the request having the earliest deadline.

\* \* \* \* \*